United States Patent Office 3,420,672
Patented Jan. 7, 1969

3,420,672
STABLE EMULSION ANIMAL FEED CONTAINING MOLASSES AND METHOD OF PRODUCING SAME
Milo D. Appleman, Los Angeles, Calif., assignor to Jack J. Schroeder, Long Beach, Calif.
No Drawing. Filed Feb. 12, 1965, Ser. No. 432,387
U.S. Cl. 99—6         7 Claims
Int. Cl. A23k 1/02

ABSTRACT OF THE DISCLOSURE

An emulsified animal feed which contains molasses, animal and vegetable fats and 0.001–0.6% starch.

---

This invention relates generally to the production of animal feeds contatining molasses together with animal and vegetable fats or oils as well as possible other ingredients—which animal feeds are rendered permanently homogeneous and stable so that there will be no separation of the oil-soluble phase (containing fats and oils) from the water-soluble phase (containing the molasses).

Molasses and animal vegetable fats or oils (including fatty acids, and acidulated fats and acidulated soap stocks and acidulated oils) are desirable for the feeding of animals e.g. cattle, sheep, swine and poultry for many reasons. In general, the fats or oils have high energy value and are very important nutritionally to the well-being of the animal. Molasses is a cheap source of carbohydrates for the animal. The animal will tolerate and eat as much molasses as is required for proper conditioning and nutrition but may shy away from certain fats or oils.

In the normal method of animal feeding the farmer transports the molasses from a storage tank through piping into a mixer, and also transports the fats and oils through other piping into the same mixer. There are several important disadvantages to the normal method of animal feeding.

Firstly, separate storage tanks for the two classes of materials are required where separate feeding of the molasses and fats or oils is followed. The associated piping and pumping equipment necessarily becomes more expensive and complicated than if one storage tank and associated pumping equipment and piping could be employed to transport a stable emulsion of molasses and fats or oils to the feed trough.

When the farmer attempts to mix the molasses and fats or oils prior to feeding to achieve an emulsion, aside from the increased cost of labor and equipment necessary to accomplish this, the emulsions normally break very quickly, and a two-phase system results. When the emulsion breaks rapidly, the fat or oil phase separates and floats on top of the molasses. If the molasses and fat or oil of high viscosity is admixed, an emulsion is formed which will have some measure of stability—but will nevertheless, normally, break down over a short period of time e.g. several days, into the two phase system just noted. The two phase system is disadvantageous for several reasons.

Some animals will eat more fat or oil than their diet calls for when it is readily available. Also, some animals do not find palatable certain fats or oils, and will therefore tend to ignore the fats or oils and therefore, will ignore the molasses lying thereunder. Further, certain fats or oils tend to become rancid upon exposure to air even if antioxidants have been added thereto if sufficient time elapses.

For the foregoing reasons, among others, manufacturers of animal feeds have long sought a means of producing a stable emulsion of livestock edible vegetable and animal fats and oils with molasses in an inexpensive and efficient manner.

While there have been many attempts to emulsify molasses and livestock edible animal and vegetable oils, for animal feed purposes, with conventional emulsifying agents, no one to my knowledge has achieved a stable emulsification of these components (by the term "stable" I mean a period of about 30 days or more).

Bearing in mind the foregoing facts, it is a major object of the present invention to produce emulsions of molasses with livestock edible animal and vegetable oils and/or fats in a very inexpensive and simpler manner, which emulsions are stable over a wide variety of temperature and humidity conditions.

It is a further object of the present invention to produce a stable pumpable liquid emulsion, semi-liquid emulsion or solid emulsion for animal feed purposes, in an inexpensive and efficient manner which emulsion includes molasses and livestock edible animal and vegetable fats and oils.

It is yet a further object of the present invention to produce a stable emulsion of molasses, livestock edible animal and vegetable fats and oils, and other biochemically nutritive ingredients, for animal feed purposes, in an inexpensive and simple manner.

These and other objects of the present invention will become more clearly understood with reference to the following detailed description.

In general, it has been found that any of the animal and vegetable fats and oils, as well as the fatty acids, can be admixed with molasses, as well as a host of other biochemically nutritive ingredients and other ingredients to form a stable emulsion by the use of any of the various starches or starch degradation products including dextrin. It is further found that the viscosity of the emulsions can be readily varied so as to achieve very pumpable liquids, semi-liquids and solids depending on the type and amount of starch or starch degradation product employed and depending also upon the viscosity of molasses and upon the type and viscosity of animal or vegetable oil or fat used. Each of these various type of emulsions are found to be stable and can be widely used for animal feed purposes either as a supplement to the main feeding (of perhaps grain) or as the main feed itself.

Although there are a variety of mixing techniques and steps that may be utilized in the preparation of the stable emulsions of my invention, it is generally preferred to blend starch into the molasses and to next add to the molasses-starch system any one or more of a variety of water-soluble ingredients for biochemically nutritional and other purposes such as, antibacterial (preservative) agents, nitrogeneous compounds such as urea and ammonium sulfate, phosphoric compounds such as ammonium phosphate or phosphoric acid, antibiotics, minerals, hormones and water-soluble antioxidants. The livestock edible animal and vegetable oils or fats and oil-soluble vitamins and other oil-soluble ingredients are next blended into the molasses-starch system with a mixing means such as a high-speed blender, a motorized agitator, or a colloid mill. The order of addition and mixing of the various constituents of my invention is not considered critical, and it will be understood that the aforementioned order of addition is merely a preferred method of preparing the stable emulsions of my invention.

Molasses is the draining or residue from the crystallization of cane or beet sugar and chemically comprise mainly invert sugar, sucrose, water, salts and other carbohydrates. Molasses has also been derived from wood pulp. Molasses has varying amounts of solids remaining therein which affects the viscosity thereof and the measure of the amount of such solids is normally given in terms of Brix. The molasses used in this invention has a consistency varying from a thin to a thick syrup and normally falls within the range of 50–90 Brix, although molasses of 65–85 Brix is generally preferred.

The fats and oils employed in my invention are those livestock edible water-insoluble fats and oils derived from animal and vegetable sources and vary in consistency from liquids to solids at room temperature. Most water-insoluble animal and vegetable oils are mixtures of distinct triglycerides, i.e. glyceryl esters of stearic, palmitic, oleic, and other acids. The viscosity of the particular fat or oil depends upon the relative proportions of the various esters that are present therein. The esters have fairly wide differences in melting point.

Those livestock edible animal and vegetable fats or oils that are capable of being stably emulsified with molasses are derived from a very wide variety of sources. Some of the most important fats and oils are listed below:

Soybean oil or soybean oil tailings or residue.
Cottonseed oil or cottonseed oil tailings or residue.
Sesame oil or sesame oil tailings or residues.
Olive oil or olive oil tailings or residues.
Corn oil or corn oil tailings or residues.
Grease, such as reclaimed restaurant fats, and greases.
Tallow.
Fish oil.
Beef fat or other animal fat.
Deodorized sewage fat.

It is also found that soap stock (which is the residue left after the animal and vegetable fats or oils have been treated with alkali to make soap), when treated with acid forms fatty acids which are palatable to animals. These fatty acids (which are known in the feed industry as acidulated soap stocks, acidulated fats and acidulated oils) are inexpensive and can be formed into a stable emulsion with molasses in accordance with my invention. A very inexpensive but effective animal feed can thus be produced.

The livestock edible fats and oils of animal and vegetable origin, the fatty acids thereof and the various acidulated oils, fats, and soap stocks will be sometimes referred to in the specification and in the claims as simply "fats and oils" or "fatty material."

The starches employed in my invention for the preparation of a stable emulsion, which chemically are polysacharides of the formula $(C_6H_{10}O_5)_x$, are derived from any one of a wide variety of plant sources. Thus, starches are derived from corn, potatoes, wheat, oats, barley and rice, by way of example. If starches are heated in the dry state or acidulated so that it is incompletely hydrolyzed, its character becomes changed. The resulting product, dextrin, forms a gel or is soluble in cold water whereas most starches are not soluble in cold water.

While starches are not soluble in cold water a swelling of starches occurs when they are heated with water and the starches assume a gelatinized condition.

Starches that will produce a gel or may be soluble in cold water are also prepared on a commercial basis, these starches having been pregelatinized. As a rule, these starches are prepared by heating with water, to produce a gel or paste and drying the product or by treatment with acids or alkalis.

I have found that starches, and starch degradation products including dextrin, have the ability to produce stable emulsion, of molasses andf livestock edible fats and oils having viscosities varying from very pumpable thin liquids to solid emulsions or gels. This is a very suprising and unexpected result. The starches and starch degradation products, that is, products which may or may not include dextrin (sometimes hereinafter referred to both in the specification and claims, by the term "starch" or "starches") are required to be at least partially gelatinized either during the process of preparing the stable emulsions itself, as by simple heating of the molasses, oil or fat and starch in the presence of water, or are gelatinized prior to the preparation of the stable emulsion. No heating is required during the preparation of the stable emulsions of my invention where pre-gelatinized starch is employed.

The amount of starch required for emulsification of the molasses and fats or oils depends primarily on the Brix of the molasses, the viscosity of the particular fat or oil being used, the proportionate amount of oil or fat being used and the type of starch. While there is no upper limits on the amount of starches that can be employed since the starches are edible, a limit on the amount of starches employed is set by the ultimate viscosity desired. Thus, a pumpable or flowable emulsion may be desired where trough feeding is employed or a solid emulsion may be desired for range feeding.

I have found that when using molasses of 70 Brix, a stable pumpable emulsion has been made using as low as 0.001% starch, by weight, based on the total weight of the molasses and fatty material. A stable pumpable emulsion can in some cases, be achieved utilizing a 70 Brix molasses when the starch content reaches as high as 0.6% by weight, of the weight of molasses and fatty material. Since it is also desirable to produce a solid molasses-oil emulsion or gel, a molasses of 70–90 Brix is preferably employed, for such purposes, along with a starch content ranging from 0.2% to as high as 10% by weight, of the total weight of the molasses and fatty material. While a higher starch content could be employed, it has little further practical effect in achieving the desired results.

In general, in preparing a pumpable emulsion of my invention, an ungelatinized starch is first added to from between 5–20% water, by weight of the total weight of molasses and fatty material. For the preparation of the solid emulsion, the starch is added directly to the molasses and if not pregelatinized is gelatinized by the water contained within the molasses itself with or without heating depending upon the type of starch employed. However, it is found that a larger amount of raw starch is required to emulsify the molasses and oil or fat if no water addition is made to the molasses and if the molasses is not heated.

The amount of molasses to fat or oil generally employed is primarily a matter of choice but, it is believed most desirable to employ from between about 0.25 part to 10 parts of a fat or oil, by weight, to 10 parts molasses, by weight. That is to say, the fat or oil is normally present in an amount of between about 2% to about 60% by weight, of the total weight of the molasses and fatty material. The gelatinized starches, used herein, for emulsificaton of the molasses and oil are readily able to emulsify the normal upper limits of oil in the molasses, as just given, and is readily capable, also, of stably emulsifying a higher percentage of oil in molasses if that should be required.

By way of comparison, if a 70 Brix molasses is attempted to be emulsified with a cottonseed oil (the oil being present in the amount of 30% by weight, of the total weight of molasses and fatty material) without the addition of gelatinized starch, an emulsion can be obtained—but this emulsion breaks, at 70° F., within a few days.

The following formulations in Example 1 illustrate the precise ingredients in a variety of stable oil-molasses pumpable emulsions made in accordance with my invention. All of the examples employ a fairly high loading of the fat or oil in molasses (30% by weight of fatty material by total weight of molasses and fatty material).

Example 1

The following ingredients are employed:

| | Parts by weight |
|---|---|
| Water | 50 |
| Starch | 0.3 |
| Molasses—70 Brix | 350 |
| Ammonium phosphate | 20 |
| Urea | 40 |

|                                                                 | Parts by weight |
|---|---|
| Sodium benzoate | 10.6 |
| Sorbistat (potassium salt of sorbic acid manufactured by Chas. Pfizer & Co.) | 0.6 |
| Acidulated cottonseed oil | 150 |
| Tenox (manufactured by Tennessee Eastman Co. and comprising various anti-oxidants such as butylated hydroxy anisole and butylated hydroxy toluene) | 0.01 |

The starch was first added to the water and the water was then heated to boiling (100° C.). Upon heating of the water to between 50–70° C. a partial gel was produced. Upon heating further, the viscosity increased indicating further gelatinization of the starch. The boiled water-starch gel was then added to the molasses and stirred to uniformly distribute the starch. The water-soluble additives are then added to the molasses-starch system, i.e. ammonium phosphate, urea, sodium benzoate and the Sorbistat. The ammonium phosphate and urea are added for nutritional purposes; the benzoate and Sorbistat are preservatives. The cottonseed oil is then added along with the oil-soluble Tenox.

The above mixture is emulsified by means of a high-speed mixer and a stable emulsion resulted. The emulsion of Example 1 is a light gel but is somewhat pumpable at a temperature of 95° F.

Examples 2–8

The following Examples 2–8 are formulations showing the use of various types of fats and oils, as well as the use of varying amounts of starch. Examples 2–8 were formulated in the manner described in Example 1.

EXAMPLES 2–8
[Parts by weight]

|  | 2 | 3 | 4 | 5 | 6 | 7 | 8 |
|---|---|---|---|---|---|---|---|
| Water | 50 | 50 | 50 | 50 | 50 | 50 | 50 |
| Starch | 0.3 | 0.15 | 0.15 | 0.15 | 0.15 | 0.15 | 0.15 |
| Molasses—70 Brix | 350 | 350 | 350 | 350 | 350 | 350 | 350 |
| Ammonium Phosphate | 20 | 20 | 20 | 20 | 20 | 20 | 20 |
| Urea | 40 | 40 | 40 | 40 | 40 | 40 | 40 |
| Benzoate | 0.6 | 0.6 | 0.6 | 0.6 | 0.6 | 0.6 | 0.6 |
| Sorbistat | 0.6 | 0.6 | 0.6 | 0.6 | 0.6 | 0.6 | 0.6 |
| Oil | [1] 150 | [2] 150 | [1] 150 | [3] 150 | [4] 150 | [5] 50 | [6] 150 |
| Tenox | 0.01 | 0.01 | 0.01 | 0.01 | 0.01 | 0.01 | 0.01 |

[1] Acidulated corn oil used.
[2] Acidulated cottonseed oil used.
[3] Fish oil.
[4] Tallow.
[5] Sewage fat.
[6] Olive oil.

The formulation of Example 2 is a stable, somewhat pumpable, emulsion at 95° F. The formulations of Examples 3 and 4 are stable and readily pumpable at 70° F. This is because of the use of only 0.03% starch in Examples 3 and 4 rather than 0.06% starch in Examples 1 and 2.

By way of comparison, if the starch were omitted from any of the foregoing examples, the emulsions would break within a matter of several days.

Examples 9–12

Examples 9 and 10 below illustrate the preparation of a solid emulsion for the range feeding of cattle and are prepared in accordance wtih the directions given for Examples 1, except that the starch is added directly to the molasses without any intermediate water-starch gel being made. Inert ingredients, such as bentonite or kaolin are added in order to still further increase the hardness of the solid emulsions of Examples 9 and 10 although it should be understood that such ingredients are not necessary to obtain the solid stable emulsion. Each of Examples 9 through 12 employs a different fat or oil.

Examples 11 and 12 further illustrate the preparation of a solid stable emulsion of molasses and oil, utilizing five times the amount of starch used in Examples 9 and 10, the total amount of starch being 6% by weight of the total weight of the molasses and oil.

The formulations of these Examples 9–12 follow:

EXAMPLES 9–12
[Parts by weight]

|  | 9 | 10 | 11 | 12 |
|---|---|---|---|---|
| Molasses—70 Brix | 350 | 350 | 350 | 350 |
| Ammonium Phosphate | 20 | 0 | 20 | 0 |
| Ammonium Sulfate | 0 | 60 | 0 | 60 |
| Urea | 20 | 20 | 40 | 0 |
| Starch | 6 | 6 | 30 | 30 |
| Sodium benzoate | 0.1 | 0.1 | 0.1 | 0.1 |
| Sorbistat | 0.1 | 0.1 | 0.1 | 0.1 |
| Oil | [1] 150 | [2] 150 | [3] 150 | [4] 150 |
| Bentonite | 10 | 0 | 10 | 10 |
| Kaoline | 0 | 10 | 0 | 0 |

[1] Sesame oil.
[2] Restaurant grease.
[3] Soybean oil.
[4] Acidulated soap stock.

Examples 13 and 14

Examples 13 and 14 illustrate the preparation of a stable pumpable emulsion utilizing 0.0025% by weight of starch, by total weight of the molasses and fat or oil. In Example 13 pregelatinized starch is employed. In Example 14, starch is heated with water just prior to its admixture is accordance with the process of Example 1. In Example 13, no heating is required as in Example 14, but the remaining process steps are similar to those of Example 1.

EXAMPLES 13 AND 14
[Parts by weight]

| Water | 44 | 44 |
|---|---|---|
| Starch (pregelatinized) | 0.014 | 0 |
| Starch (ungelatinized) | 0 | 0.014 |
| Oil-Cottonseed oil tailings | 150 | 150 |
| Ammonium Phosphate | 20 | 20 |
| Urea | 40 | 40 |
| Sodium Benzoate | 0.6 | 0.6 |
| Sorbistat | 0.6 | 0.6 |
| Tenox | 0.01 | 0.01 |
| Molasses | [1] 350 | [2] 350 |

[1] 70 Brix.  [2] 60 Briz.

Stable readily pumpable emulsions were formed in both the formulations of Examples 13 and 14.

Example 15

Example 15, the formulation for which is listed below, illustrates the use of a 100% protein cattle feed in an emulsion prepared in accordance with my invention. This example also illustrates the use of dextrin as well as starch and illustrates the use of an 80 Brix molasses. The formulation is prepared without first adding the dextrin and starch to water.

Example 15

|  | Parts by weight |
|---|---|
| Molasses—80 Brix | 350 |
| Dextrin | 6.0 |
| Starch | 6.0 |

| | Parts by weight |
|---|---|
| Sodium benzoate | 0.6 |
| Sorbistat | 0.6 |
| Diammonium phosphate | 20 |
| Urea | 223 |
| Acidulated corn oil residues | 150 |

This emulsion is prepared in accordance with the process of Example 1, except for the lack of water, as noted above. It is a solid emulsion, and is extremely stable under the wide range of atmosphereic conditions encountered.

It will be understood that these are a wide variety of chemicals that may be added to the molasses, and fat or oil emulsions of my invention. These additives may be either oil-soluble or water-soluble. In general, these additives do not comprise over 30% of the total weight of the molasses and oil or fat and do not effect the stability of the emulsions.

The most important of these additives for animal feed purposes fall into several categories: nitrogen containing compounds which have been previously specified; minerals such as phosphorous; antifungal, antiyeast and antibacterial agents such as sodium benzoate, sodium or calcium propionate and Sorbistat (these agents generally are present in amounts of between 0.05 to 0.5% of the total weight of the molasses and fat or oil); antibiotics such as tetracycline which influence the growth rate of cattle, sheep, swine and poultry; vitamins particularly vitamins A and D and ascorbic acid; and antioxidants such as propyl gallate, BHA (butylated hydroxy anisole) and BHT (butylated hydroxy toluene).

While certain specific formulations have been set forth herein, the invention is not so limited thereby in any sense. The claims which follow delineate the scope of the invention.

I claim:

1. A pumpable animal food product which comprises: livestock edible fatty material; molasses; and an emulsifier consisting essentially of one of the group of partially gelatinized starch and dextrin in an amount of between about 0.001% and about 0.6% by weight, of the total weight of said fatty material and said molasses, to retain said fatty material and said molasses as a stable pumpable emulsion.

2. The product of claim 1 wherein said product contains in addition one of the group consisting of bentonite, kaolin and gelatinized starch in amount sufficient to provide a solid emulsified food product.

3. The product of claim 1 wherein said fatty material is present in amount between about 2% to about 60%, by weight, of the total weight of said molasses and said fatty material, said fatty material being selected from the group consisting of animal fats, vegetable fats, animal oils, vegetable oils, acidulated fats, acidulated oils and fatty acids.

4. In a process for the production of an emulsified food product containing molasses and livestock edible fatty material, the steps which comprise the addition of an emulsifier consisting essentialy of one of the group of partially gelatinized starch, gelatinizable starch and dextrin to molasses, and thereafter the addition of livestock edible fatty material, the amount of said emulsifier added being between about 0.001% to about 0.6%, by weight, with respect to the total weight of said molasses and said fatty material to emulsify said molasses and said fatty material.

5. The process of claim 4 wherein sufficient thickening agent is added selected from the group consisting of bentonite, kaolin and gelatinized starch to produce a solid product.

6. The process of claim 4 wherein said food product is heated after the addition of said emulsifier.

7. In a process for the production of an emulsified food product containing molasses and livestock edible fatty material, the steps which comprise the addition of an emulsifier consisting essentially of one of the group of partially gelatinized starch, gelatinizable starch and dextrin to molasses, and thereafter the addition of livestock edible fatty material comprising from about 2% to about 60%, by weight, of the total weight of said molasses and said fatty material, said fatty material being selected from the group consisting of animal fats, vegetable fats, animal oils, vegetable oils, acidulated fats, acidulated oils, and fatty acids, the amount of said emulsifier added being between about 0.001% and about 0.6%, by weight, with respect to the total weight of said molasses and said fatty material, and being sufficient in amount to emulsify said molasses and said fatty material.

References Cited

UNITED STATES PATENTS

| 1,815,727 | 7/1931 | Reynolds et al. | 99—123 |
| 1,940,837 | 12/1933 | Bartz | 99—6 |
| 2,793,952 | 5/1957 | Rawlings | 99—6 |
| 2,807,546 | 9/1957 | Anderson et al. | 99—2 |
| 3,093,485 | 6/1963 | Partyka | 99—139 |

OTHER REFERENCES

Kerr, R. W., Ed.: Chemistry and Industry of Starch 2nd ed., Academic Press, Inc., New York, 1950, p. 634.

A. LOUIS MONACELL, *Primary Examiner.*

J. M. HUNTER, *Assistant Examiner.*

U.S. Cl. X.R.

99—2